United States Patent
Sugaya

(10) Patent No.: US 7,653,759 B2
(45) Date of Patent: Jan. 26, 2010

(54) WIRELESS COMMUNICATIONS UNIT, WIRELESS COMMUNICATIONS METHOD, WIRELESS COMMUNICATIONS SYSTEM, AND COMPUTER PROGRAM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 11/857,219

(22) Filed: Sep. 18, 2007

(65) Prior Publication Data

US 2008/0071936 A1    Mar. 20, 2008

(30) Foreign Application Priority Data

Sep. 19, 2006   (JP) ............................ P2006-253469

(51) Int. Cl.
*G06F 3/00*   (2006.01)
*G06F 13/00*   (2006.01)

(52) U.S. Cl. ........................... 710/9; 710/305; 710/313; 709/230

(58) Field of Classification Search .................. 710/8–9, 710/305, 313–315; 709/230; 455/500; 370/389–392
See application file for complete search history.

(56) References Cited

U.S. PATENT DOCUMENTS

| | | | |
|---|---|---|---|
| 2006/0179144 A1* | 8/2006 | Nagase | 709/226 |
| 2007/0242729 A1* | 10/2007 | Quinn et al. | 375/130 |
| 2007/0260801 A1* | 11/2007 | Kwak et al. | 710/305 |

OTHER PUBLICATIONS www.usb.org/developers/wusb/.

\* cited by examiner

*Primary Examiner*—Christopher B Shin
(74) *Attorney, Agent, or Firm*—Finnegan, Henderson, Farabow, Garrett & Dunner, L.L.P.

(57) ABSTRACT

There is provided a wireless communications unit that performs wireless communications with a USB host in a Wireless USB system. The wireless communications unit includes an address setting portion and a beacon creation portion. The address setting portion sets an assigned address assigned by the USB host as the wireless communications unit's own address. The beacon creation portion starts to create a beacon after the assigned address is set as the wireless communications unit's own address.

14 Claims, 12 Drawing Sheets

WIRELESS COMMUNICATIONS UNIT, WIRELESS COMMUNICATIONS METHOD, WIRELESS COMMUNICATIONS SYSTEM, AND COMPUTER PROGRAM

CROSS REFERENCE TO RELATED APPLICATION

The present invention contains subject matter related to Japanese Patent Application JP 2006-253469 filed in the Japan Patent Office on Sep. 9, 2006, the entire contents of which being incorporated herein by reference.

BACKGROUND OF THE INVENTION

1. Field of the Invention

The present invention relates to a wireless communications unit, a wireless communications method, a wireless communications system, and a computer program.

2. Description of the Related Art

A method is generally known by which a communications unit transmits data through a serial bus transmission route that is defined by the Universal Serial Bus (USB) specification. Recently, the Wireless USB specification has been defined as a method for wirelessly transmitting and receiving the data that is transmitted through the serial bus transmission route.

In the Wireless USB specification, the USB host assigns a unique USB address to a USB device in the following manner. First, the USB device, using a general-purpose address, requests the USB host to assign an address. The USB host responds to the request and assigns a temporarily valid, for example, unauthenticated address, to the USB device. Then, after the USB host authenticates the USB device, it exchanges prescribed information with the USB device, then assigns a Wireless USB device address to the USB device (see Universal Serial Bus (http://www.usb.org/developers/wusb/)).

Note that the Alliance Distributed Media Access Control specifications (hereinafter called simply the "WiMedia specifications") are defined as the Ultra-Wideband (UWB) wireless communications specifications that use Wireless USB.

According to the WiMedia specifications, the USB device transmits in a beacon slot a beacon that includes the USB device's address at the current time, as well as reservation information pertaining to a time slot that the USB device will use. After the USB device transmits the beacon, it is allowed to transmit and receive data in the time slot. Here, a configuration in which each USB device transmits the beacon in the beacon slot is used so that all the USB devices will coexist in an autonomous distributed network.

SUMMARY OF THE INVENTION

However, the address of the USB device is changed many times until the Wireless USB device address is assigned by the USB host. Thus, if a beacon that includes different address information is transmitted from the USB device every time the address of the USB device changes, it becomes cumbersome for the USB host and the USB devices in the vicinity to manage the address information. Moreover, in a Wireless USB system, the USB host can actively control the communications, so it is inappropriate to use the same sort of configuration as an autonomous distributed network.

The present invention addresses the problems described above and provides a wireless communications unit, a wireless communications method, a wireless communications system, and a computer program that are new and improved and that are capable of performing beacon transmission appropriately in a Wireless USB system.

In order to solve the problems described above, according to an embodiment of the present invention, there is provided a wireless communications unit that, as a USB device, performs wireless communications with a USB host in a Wireless USB system. The wireless communications unit includes an address setting portion and a beacon creation portion. The address setting portion sets an assigned address assigned by the USB host as the wireless communications unit's own address. The beacon creation portion starts to create a beacon after the assigned address is set as the wireless communications unit's own address. If this configuration is used, the wireless communications unit will not always create the beacon, but will start to create the beacon after an unauthenticated address, a default address, a Wireless USB device address, or the like is assigned by the USB host. Therefore, the wireless communications unit can start transmitting the beacon at an appropriate time, without creating its own address.

The assigned address may also be the Wireless USB device address. If this configuration is used, the beacon creation portion will start to create the beacon after the Wireless USB device address is set as the wireless communications unit's address. Therefore, a problem can be prevented that risks confusion among other wireless communications units in the vicinity due to the wireless communications unit's transmitting of a different address every time the wireless communications unit's address is changed by a USB host instruction.

The wireless communications unit may further include a confirmation processing portion that performs a specified confirmation processing. The confirmation processing portion may perform the confirmation processing with the USB host using a time interval that the USB host sets when it assigns the assigned address. If this configuration is used, the USB host controls the time interval in which the confirmation processing with the wireless communications unit is performed, even in a case where the wireless communications units in the vicinity, including the wireless communications unit according to the present invention, do not create and transmit the beacons by the specified time. Therefore, interference in wireless communications can be prevented, because the confirmation processing is controlled such that a plurality of wireless communications units use different time intervals.

The confirmation processing may also be an authentication processing that is performed with the USB host using the time interval that the USB host sets. If this configuration is used, the beacon creation portion will start to create the beacon when the USB host assigns the default address after the authentication processing. Therefore, when the wireless communications unit is transmitting the beacon, it can at least be determined that the wireless communications unit has been authenticated by the USB host.

The confirmation processing may also be an enumeration processing that is performed with the USB host using the time interval that the USB host sets. If this configuration is used, the beacon creation portion will start to create the beacon when the USB host assigns the Wireless USB device address after the enumeration processing. Therefore, when the wireless communications unit is transmitting the beacon, it can at least be determined that the wireless communications unit has performed the enumeration processing with the USB host.

The USB host may also be requested to re-assign the assigned address when the assigned address conflicts with an address that a USB host or USB device in the vicinity is using. If this configuration is used, the wireless communications unit may, for example, store in advance, in a storage portion, addresses that are used by USB hosts and USB devices in the vicinity. Then the address setting portion may compare the assigned address that is assigned by the USB host with the addresses that are stored in the storage portion, and if there is no address conflict, the address setting portion may set the assigned address as the wireless communications unit's own address. Therefore, a situation can be avoided in which beacons that contain the same address are transmitted within close range.

Furthermore, in order to solve the problems described above, according to another form of the embodiment of the present invention, there is provided a wireless communications method for performing wireless communication between a wireless communications unit, as a USB device, and a USB host in a wireless USB system. The wireless communications method includes a step of assigning an address to the wireless communications unit, the address being assigned by the USB host; a step of setting the address assigned by the USB host as the wireless communications unit's own address; a step of creating a beacon that contains the set address as the wireless communications unit's own address; and a step of transmitting the created beacon.

Furthermore, in order to solve the problems described above, according to another form of the embodiment of the present invention, there is provided a wireless communications system that includes a USB host and a wireless communications unit as a USB device. The USB host assigns an address to the wireless communications unit. The wireless communications unit includes an address setting portion and a beacon creation portion. The address setting portion sets an assigned address assigned by the USB host as the wireless communications unit's own address. The beacon creation portion starts to create a beacon after the assigned address is set as the wireless communications unit's own address.

Furthermore, in order to solve the problems described above, according to another form of the embodiment of the present invention, there is provided a computer program that includes instructions that direct a computer to function as a wireless communications unit. The wireless communications unit includes an address setting portion and a beacon creation portion. The address setting portion sets an assigned address assigned by the USB host as the wireless communications unit's own address. The beacon creation portion starts to create a beacon after the assigned address is set as the wireless communications unit's own address.

According to the embodiment and forms of the embodiment of the present invention described above, it is possible to perform beacon transmission appropriately in a Wireless USB system.

DETAILED DESCRIPTION OF THE PREFERRED EMBODIMENTS

Figure 1:
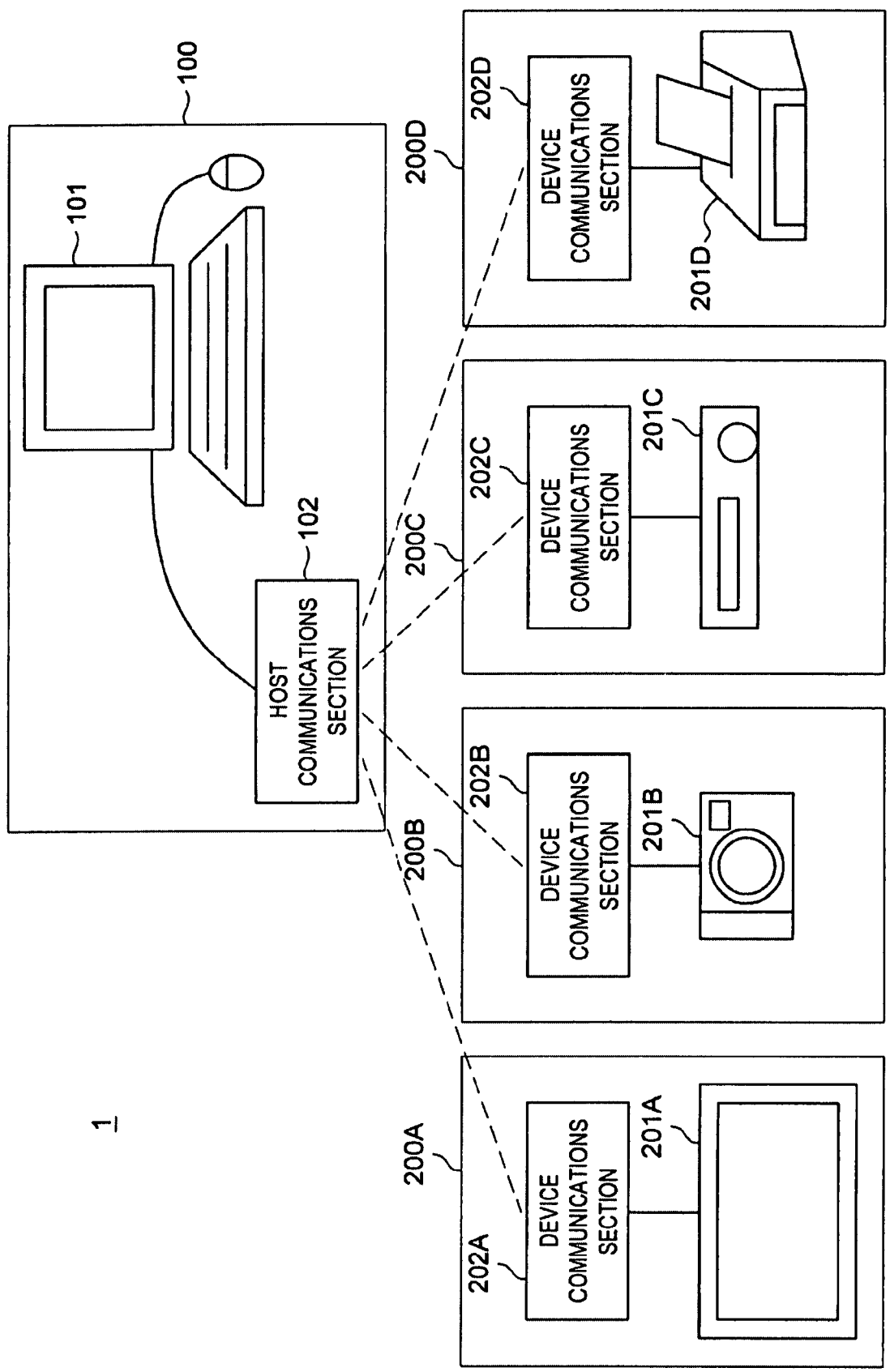
FIG. 1 is an explanatory figure that shows an example of a configuration of a Wireless USB system according to an embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

First, a Wireless USB system according to an embodiment of the present invention will be explained.

FIG. 1 is an explanatory figure that shows an example of a configuration of the Wireless USB system according to the embodiment. The Wireless USB system 1 includes a USB host 100 and USB devices 200A to 200D.

The USB host 100 includes a host computer 101 and a host communications section 102 that is connected to the host computer 101 through a USB 2.0 cable or the like. The host computer 101 has a built-in host function that controls communications with the USB devices 200A to 200D. In addition, the host communications section 102 converts data received from the host computer 101 into a wireless signal and transmits the wireless signal. The host communications section 102 also decodes wireless signals received from the USB devices 200A to 200D and transmits them to the host computer 101.

Therefore, the host computer 101 can perform wireless communications with the USB devices 200A to 200D through the host communications section 102, based on the Wireless USB specification. The host communications section 102 may also be a host wire adaptor. Furthermore, the USB host 100 may be the host computer 101 equipped with a built-in wireless communications function and functioning as a Wireless USB host.

Note that the USB host is not limited to the host computer 101. The USB host may also be, for example, an information processing unit such as a household image processing unit (DVD recorder, videotape deck, or the like), a mobile telephone, a Personal Handyphone System (PHS), a mobile music playback unit, a mobile image processing unit, a personal digital assistant (PDA), a household game unit, a mobile game unit, a household electrical appliance, or the like.

The USB device 200A includes a display unit 201A and a device communications section 202A that is connected to the display unit 201A through a USB 2.0 cable or the like. The display unit 201A can perform wireless communications with the USB host 100 through the device communications section 202A, based on the Wireless USB specification and under the wireless communications control of the USB host 100. The device communications section may also be a device wire adaptor. Furthermore, the USB device 200A may be the display unit 201A equipped with a built-in wireless communications function and functioning as a Wireless USB device.

The configurations of the USB devices 200B to 200D are substantially the same as that of the USB device 200A, except that the device 200B includes a digital camera 201B as a communications device, the device 200C includes a video recorder 201C as a communications device, and the device 200D includes a printer 201D as a communications device. In the explanation below, the USB devices 200A to 200D will be called the USB devices 200 in cases where it is not necessary to distinguish among them.

In this manner, the Wireless USB system 1 forms a network configuration centered around the USB host 100. Note that in FIG. 1, the connections between the host computer 101 and the host communications section 102, and between the display unit 201A and the device communications section 202A, are not limited to a USB 2.0 cable or the like, and design changes may be made freely.

Next, a communications method in the Wireless USB system 1 will be explained with reference to FIG. 2.

Figure 2:
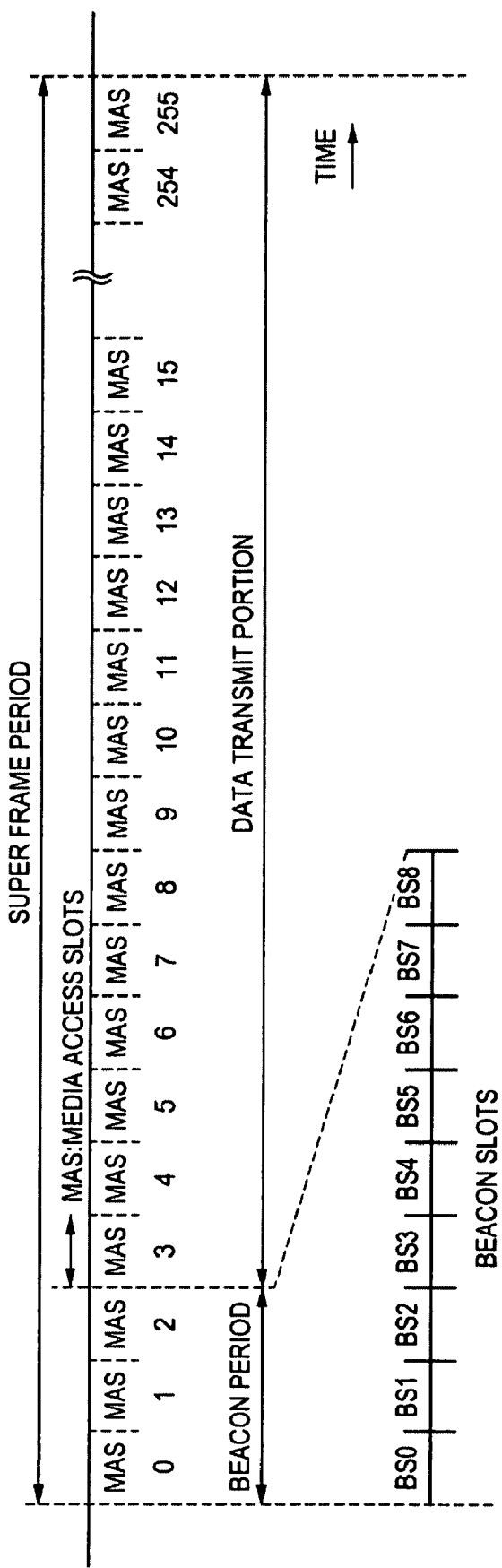
FIG. 2 is an explanatory figure that shows an example of a structure of a super frame according to the Wireless USB specification.

FIG. 2 is an explanatory figure that shows an example of a structure of a super frame according to the Wireless USB specification. The super frame is defined as a specific time interval that serves as a super frame period, and it is further segmented into 256 Media Access Slots (MAS) from MAS-0 to MAS-255. The USB host 100 and the USB devices 200 can utilize any number of the MAS periods to perform their respective communications. The MAS periods can be set to 256 μs each, for example.

A beacon period and a data transmit portion are also disposed in the super frame, as shown in FIG. 2.

Beacon slots are defined as specified intervals in the beacon period. The beacon slots are configured such that each of the USB host 100 and the USB devices 200 uses a unique beacon slot and various types of parameters are exchanged as control information with surrounding communications units. The length of the beacon period depends on the number of communications units that are present in the vicinity at the time, and the required length is determined accordingly. In the present embodiment, using MAS-0 to MAS-2, a total of 9 beacon slots are provided, from the beacon slot BS0 to the beacon slot BS8.

Figure 3:
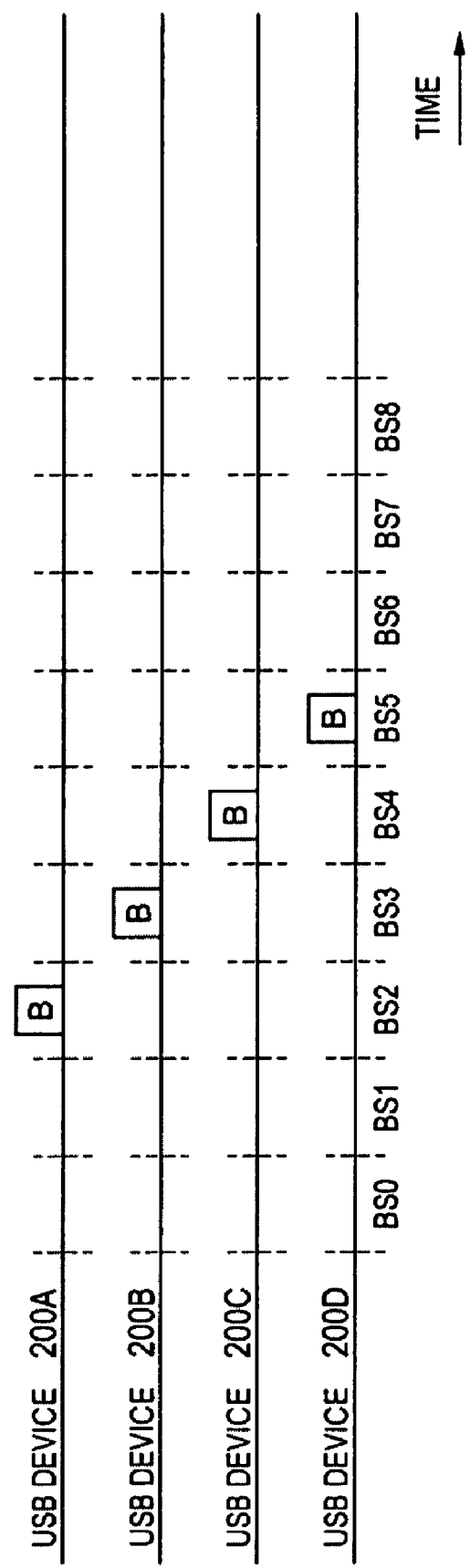
FIG. 3 is an explanatory figure that shows examples of use settings for beacon slots.

FIG. 3 is an explanatory figure that shows examples of use settings for the beacon slots. To provide a more detailed explanation, FIG. 3 shows the end result of a process by which each of the USB devices 200A to 200D that are included in the single Wireless USB system selects the beacon slot it will use by notifying the other devices of the beacon slots that are not being used.

In the configuration example shown in FIG. 3, the USB device 200A transmits its beacon in the beacon slot BS2, the USB device 200B transmits its beacon in the beacon slot BS3, the USB device 200C transmits its beacon in the beacon slot BS4, and the USB device 200D transmits its beacon in the beacon slot BS5. The details of this configuration will be explained later, but in the present embodiment, the USB devices 200 may not necessarily transmit the beacons in their own beacon slots BS.

Furthermore, the beacon slot BS0, the beacon slot BS1, the beacon slot BS6, the beacon slot BS7, and the beacon slot BS8 are reserved for the use of communications units that join the network later.

Figure 4:
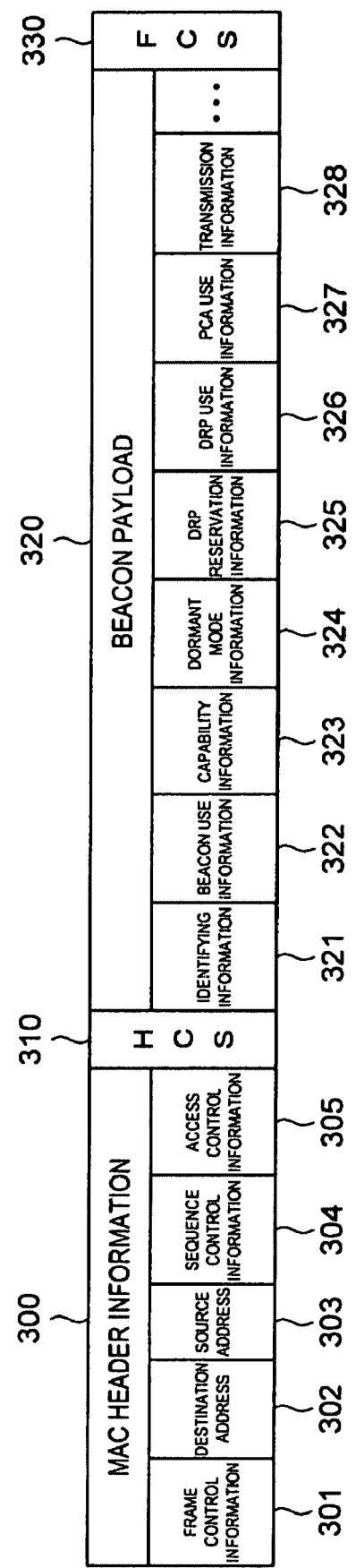
FIG. 4 is an explanatory figure that shows an example of a configuration of a beacon frame that is transmitted in the beacon slots.

FIG. 4 is an explanatory figure that shows an example of a configuration of a beacon frame 30 that is transmitted in the beacon slots. The beacon frames 30 are transmitted from each of the USB devices 200 and the USB host 100 during the beacon period, which is a control portion of the super frame. The transmission and receiving of the beacon frames 30 allows the various types of parameters to be exchanged as control information with the surrounding units.

As shown in FIG. 4, the beacon frame 30 includes MAC header information 300, a header check sequence (HCS) 310, beacon payload information 320, and a frame check sequence (FCS) 330.

Furthermore, the MAC header information 300 includes frame control information 301, a destination address 302 that is the address of the receiver, a source address 303 that is the address of the transmitter, sequence control information 304, such as a sequence number and the like, and access control information 305 that carries parameters that are necessary for access control. Note that the USB devices 200 and the USB host 100 can set a special address for broadcasting as the destination address 302, without specifying a destination. Note also that the address that is set as the address of the transmitting device is set as the source address 303.

The beacon payload information 320 includes identifying information 321, beacon use information 322, capability information 323, dormant mode information 324, DRP reservation information 325, DRP use information 326, PCA use information 327, and transmission information 328. The identifying information 321 is a parameter for the transmitting unit. The beacon use information 322 shows beacon slot use. The capability information 323 shows the capability of the transmitting communications unit. The dormant mode information 324 is added in the case of operation in hibernation mode. The DRP reservation information 325 shows the MAS positions reserved under the Distributed Reservation Protocol (DRP). The DRP use information 326 shows the MAS positions that can be used for DRP reservations. The PCA use information 327 shows the MAS positions that can be used for Prioritized Contention Access (PCA) communications. The transmission information 328 shows that data is present that will be transmitted to a receiving communications unit.

Note that the beacon frame 30 may be configured such that any of the various types of parameters may be added and deleted as necessary.

Next, a configuration of an MMC frame 40 that is transmitted from the USB host 100 in the data transmit portion will be explained with reference to FIG. 5.

Figure 5:
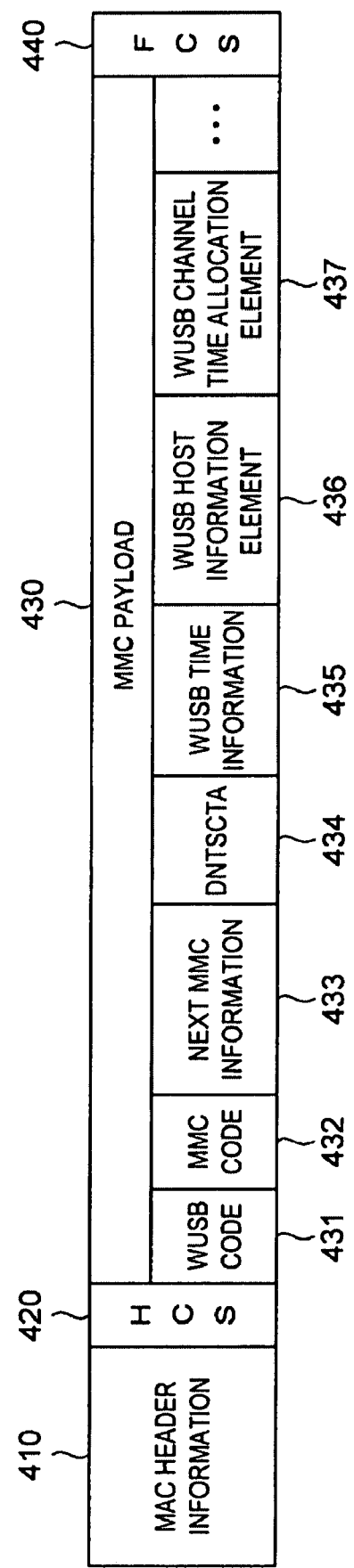
FIG. 5 is an explanatory figure that shows a configuration of an MMC frame.

FIG. 5 is an explanatory figure that shows the configuration of the MMC frame 40. The MMC frame 40 includes MAC header information 410, a header check sequence (HCS) 420, MMC payload information 430, and a frame check sequence (FCS) 440.

The MAC header information 410 is the same as the MAC header information 300 in the beacon frame 30, so it will not be explained. The HCS 420 is information that is added to detect an error in the header.

The MMC payload information 430 includes a WUSB code 431, an MMC code 432, next MMC information 433, a Device Notification Time Slot Channel Time Allocation (DNTSTCA) 434, WUSB time information 435, a WUSB host information element 436, and a WUSB channel time allocation element 437.

The WUSB code 431 is a code that indicates that the MMC frame 40 is a Wireless USB frame. The MMC code 432 is a code that indicates that the frame 40 is an MMC frame. The next MMC information 433 is information that indicates the time until the next MMC frame will be transmitted.

The DNTSTCA 434 is information that indicates a time slot that is provided for the USB device 200 to transmit a Device Connect (DN_Connect) requesting a connection to the USB host 100. The WUSB time information 435 is information that indicates a Wireless USB synchronous time interval. The WUSB host information element 436 is a host identifier that identifies the Wireless USB host communications unit. The WUSB channel time allocation element 437 is information in which is recorded a Time Division Multiple Access control time within the MAS. Note that these items can be added or deleted according to need or purpose.

Next, the operation and problems of a Wireless USB system 2 that is linked to the Wireless USB system 1 according to the present embodiment will be explained with reference to FIGS. 6 to 8.

Figure 6:
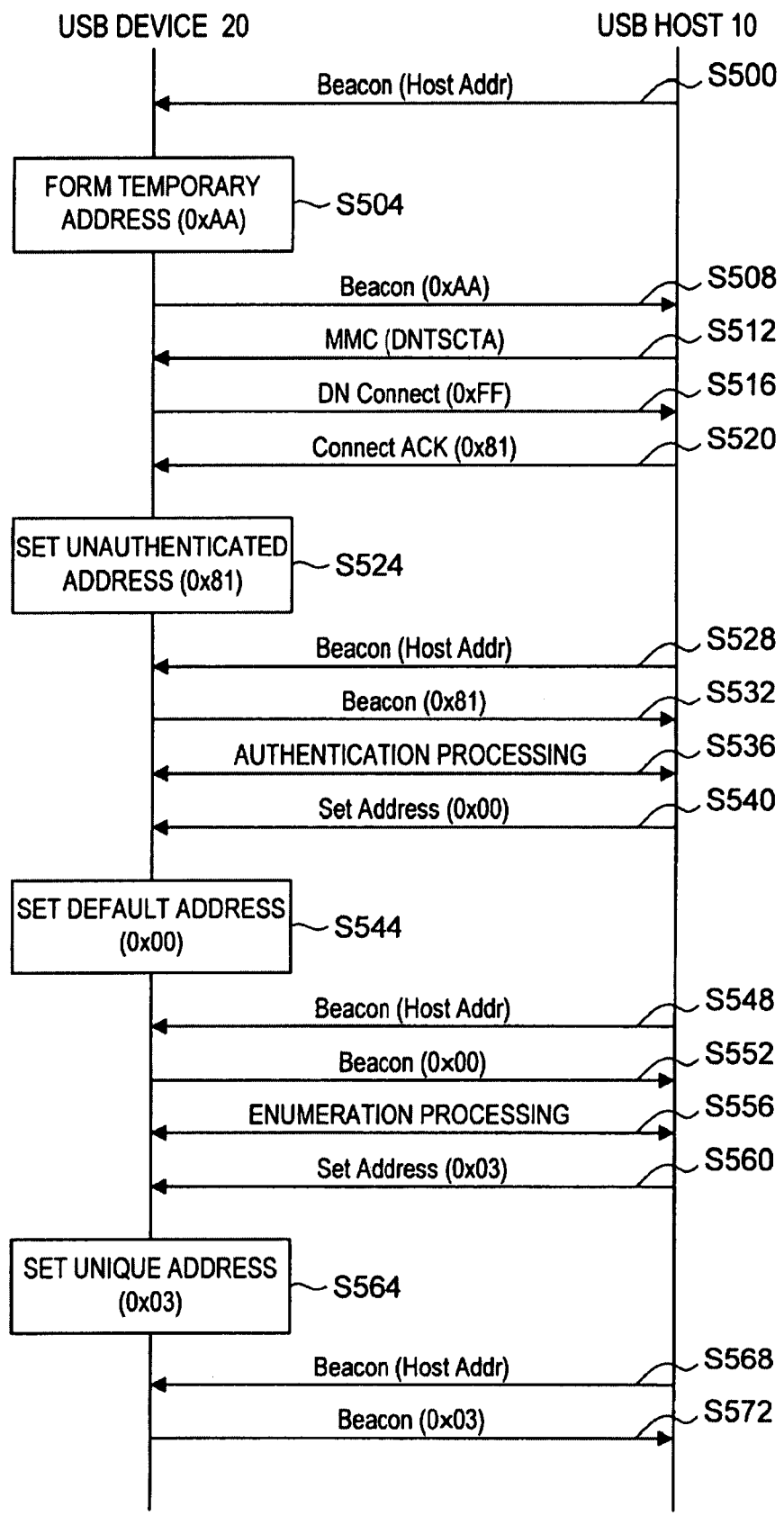
FIG. 6 is a timing chart that shows the flow of operation of a Wireless USB system that is linked to the Wireless USB system according to the embodiment of the present invention.

FIG. 6 is a timing chart that shows a flow of operation of the Wireless USB system 2 that is linked to the Wireless USB system 1 according to the present embodiment. In the example shown in FIG. 6, the Wireless USB system 2 includes a USB host 10 and a USB device 20.

First, the USB host 10 transmits to its surroundings a beacon containing the address (Host Addr) of the USB host 10. The USB device 20 can receive the beacon (Step S500). Next, the USB device 20 creates a temporary address (0xAA) and registers 0xAA as its address (Step S504). Then the USB device 20, when its beacon slot comes, transmits to its surroundings a beacon containing 0xAA as its address, and the USB host 10 receives the beacon (Step S508).

Next, the USB host 10 transmits an MMC frame that contains a DNTSCTA (Step S512). The DNTSCTA, as explained above, is information that indicates a time slot that is provided for the USB device 20 to transmit a DN_Connect requesting a connection to the USB host 10. When the USB device 20 receives the MMC frame, the USB device 20 transmits the DN_Connect to the USB host 10 based on the DNTSCTA (Step S516). Note that in the MAC header of the DN_Connect, 0xFF is entered as the device address.

Next, the USB host 10 transmits a Connect Acknowledge in response to the DN_Connect from the USB device 20 (Step S520). The transmission of the Connect Acknowledge from the USB host 10 assigns to the USB device 20 an unauthenticated address 0x81 as an assigned address, and the USB device 20 sets the unauthenticated address 0x81 as its address (Step S524).

Thereafter, when the beacon period comes, the USB host 10 transmits a beacon that contains the host address (Step S528), and the USB device 20 transmits a beacon that contains the unauthenticated address 0x81 as the device address (Step S532). Next, the USB host 10 and the USB device 20 perform authentication processing to authenticate one another (Step S536). The authentication processing may be a 4-way handshake, for example. When the authentication processing is completed, the USB host 10 transmits a Set Address (0x00) that instructs the USB device 20 to set the device address to the default address 0x00 as an example of the assigned address (Step S540).

When the USB device 20 receives the Set Address (0x00), it sets its own address to the default address 0x00 (Step S544). Thereafter, when the beacon period comes, the USB host 10 transmits a beacon that contains the host address (Step S548), and the USB device 20 transmits a beacon that contains the default address 0x00 as the device address (Step S552).

Next, the USB host 10 and the USB device 20 perform enumeration processing (Step S556). The enumeration processing includes processing that exchanges information that indicates various types of parameters of the USB host 10 and the USB device 20 that are called descriptors. When the enumeration processing is completed, the USB host 10 transmits a Set Address (0x03) that instructs the USB device 20 to set the device address to the Wireless USB address 0x03 as an example of the assigned address (Step S560). A Wireless USB address is uniquely assigned to each USB device 20 by the USB host 10 and is hereafter called the unique address.

When the USB device 20 receives the Set Address (0x03), it sets its own address to the unique address 0x03 (Step S564). Thereafter, when the beacon period comes, the USB host 10 transmits a beacon that contains the host address (Step S568), and the USB device 20 transmits a beacon that contains the unique address 0x03 as the device address (Step S572).

In this manner, the Wireless USB system 2 that is linked to the Wireless USB system 1 according to the present embodiment starts creating and transmitting beacons after the device address is created at Step S504. However, with this configuration, it is possible that excessive address conflicts will occur when a plurality of USB devices are present in the vicinity. This will be explained in detail below with reference to FIGS. 7 and 8.

Figure 7:
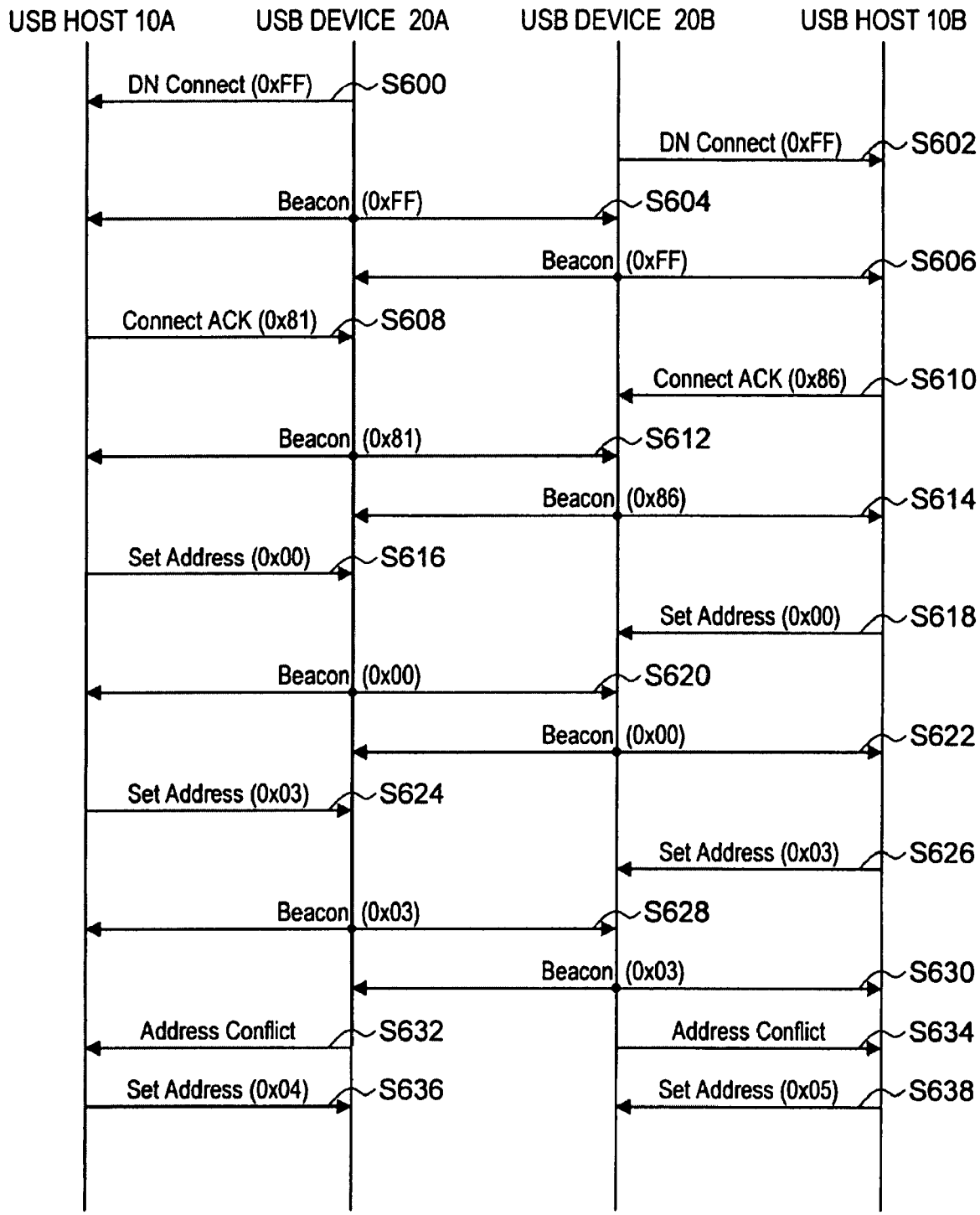
FIG. 7 is a timing chart that shows operations of the Wireless USB system that is linked to the present invention when the Wireless USB system is in close proximity to a plurality of USB hosts and USB devices.

FIG. 7 is a timing chart that shows the operation of the Wireless USB system 2 when a plurality of USB hosts 10 and USB devices 20 are nearby. FIG. 8 is a flowchart that shows a flow of operations of the USB devices 20. The Wireless USB system 2 includes a USB host 10A, a USB device 20A that performs wireless communications with the USB host 10A, a USB host 10B, and a USB device 20B that performs wireless communications with the USB host 10B.

First, explaining the system with reference to FIG. 7, the USB device 20A transmits the DN_Connect (0xFF) to the USB host 10A (Step S600). In the same manner, the USB device 20B transmits the DN_Connect (0xFF) to the USB host 10B (Step S602).

Next, the USB device 20A, when its beacon slot comes, transmits to its surroundings a beacon that contains 0xFF as the device address (Step S604). In the same manner, the USB device 20B, when its beacon slot comes, also transmits to its surroundings a beacon that contains 0xFF as the device address (Step S606). Here, the USB device 20A and the USB device 20B are both transmitting beacons that contain 0xFF as the device address, so a first address conflict occurs.

Next, the USB host 10A transmits a Connect Acknowledge (0x81) to the USB device 20A (Step S608). In the same manner, the USB host 10B transmits a Connect Acknowledge (0x86) to the USB device 20B (Step S610). Then the USB device 20A, when its beacon slot comes, transmits to its surroundings a beacon that contains 0x81 as the unauthenticated device address (Step S612). In the same manner, the USB device 20B, when its beacon slot comes, transmits to its surroundings a beacon that contains 0x86 as the unauthenticated device address (Step S614). Here, if the USB device 20A and the USB device 20B have both set the same unauthenticated address, a second address conflict will occur.

Next, the USB host 10A transmits a Set Address (0x00) to the USB device 20A (Step S616). In the same manner, the USB host 10B transmits a Set Address (0x00) to the USB device 20B (Step S618). Then the USB device 20A, when its beacon slot comes, transmits to its surroundings a beacon that contains the default address 0x00 as the device address (Step S620). In the same manner, the USB device 20B, when its beacon slot comes, transmits to its surroundings a beacon that contains the default address 0x00 as the device address (Step S622). Here, the USB device 20A and the USB device 20B are both using the same default address 0x00, so a third address conflict occurs.

Next, the USB host 10A transmits a Set Address (0x03) to the USB device 20A (Step S624). In the same manner, the USB host 10B transmits a Set Address (0x03) to the USB device 20B (Step S626). Then the USB device 20A, when its beacon slot comes, transmits to its surroundings a beacon that contains the unique address 0x03 as the device address (Step S628). In the same manner, the USB device 20B, when its beacon slot comes, transmits to its surroundings a beacon that contains the unique address 0x03 as the device address (Step S630). Here, the USB device 20A and the USB device 20B are both using the same unique address 0x03, so a fourth address conflict occurs.

When the unique address conflict occurs in this manner, the USB device 20A transmits an Address Conflict Notification to the USB host 10A, and the USB device 20B transmits an Address Conflict Notification to the USB host 10B (Steps S632, S634). The notifications function as unique address re-assignment requests, so the USB host 10A transmits a Set Address (0x04) to the USB device 20A (Step S636). In addition, the USB host 10B transmits a Set Address (0x05) to the USB device 20B (Step S638). Now the USB device 20A and the USB device 20B are using different unique addresses, so the unique address conflict can be resolved.

Figure 8:
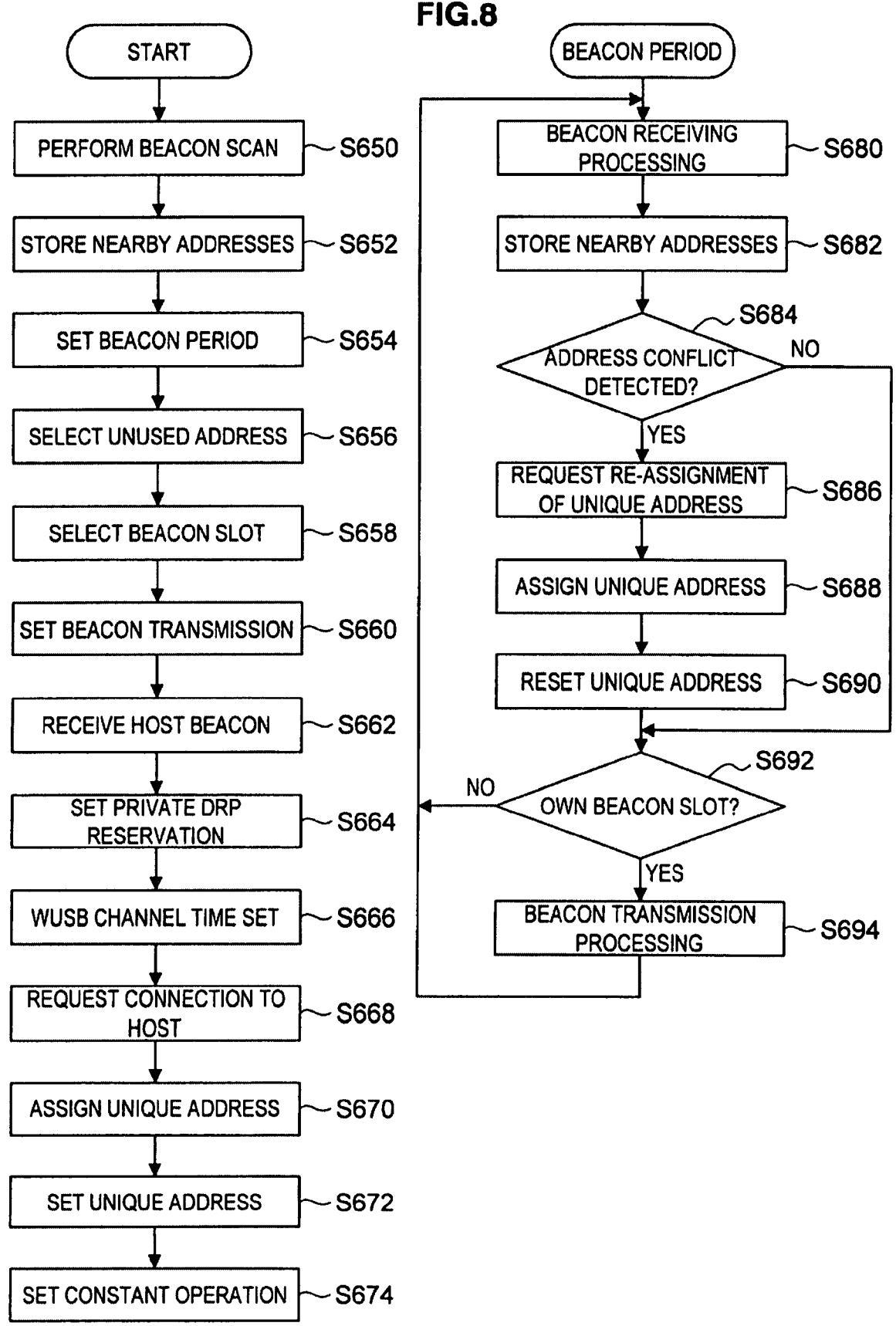
FIG. 8 is a flowchart that shows a flow of operation of a USB device that is linked to the present invention.

Next, referring to FIG. 8, the USB device 20 scans to receive beacons that are transmitted by nearby USB hosts or devices (Step S650). Then the USB device 20 stores in a storage portion the addresses that are contained in the beacons it receives (Step S652). The USB device 20 also sets the beacon period based on the beacons it receives (Step S654).

Next, the USB device 20 creates a temporary address by selecting an unused address in the vicinity (Step S656). The USB device 20 also selects an unused beacon slot (Step S658), then makes settings so as to transmit a beacon using the selected beacon slot and the temporary address (Step S660). Then the USB device 20 receives a beacon from the USB host 10 (Step S662) and makes a private DRP reservation based on the DRP reservation status contained in the host beacon (Step S664).

Next, the USB device 20 sets the WUSB channel time in the private DRP reservation (Step S666) and requests connection to the USB host 10 in the set time interval (Step S668). Then the USB host 10 assigns a unique address to the USB device 20 through the authentication processing, the enumeration processing, and the like (Step S670). Next, the USB device 20 sets the assigned unique address as its device address (Step S672) and thereafter operates routinely (Step S674).

In parallel with the processing in Steps S650 to S674 described above, the USB device 20, when its beacon slot comes, also performs the processing in Steps S680 to S694 described below. That is, during the beacon period, the USB device 20 receives beacons that are transmitted by nearby units (Step S680). Then the USB device 20 stores in the storage portion the addresses that are contained in the beacons it receives (Step S682).

Next, the USB device 20 determines whether or not there is a unique address conflict (Step S684). In a case where the USB device 20 determines that there is a unique address conflict, it requests the USB host 10 to re-assign the unique addresses (Step S686). Then, when the USB host 10 re-assigns the unique addresses (Step S688), the USB device 20 resets its own device address to the newly assigned unique address (Step S690).

After resetting the unique address, or after determining at Step S684 that there is no address conflict, the USB device 20 transmits a beacon in its own beacon slot (Steps S692, S694).

Thus it is thought that in the Wireless USB system 2, when a unique address conflict occurs, the unique address conflict can be resolved by requesting the USB host to re-assign the unique addresses. However, in a case where the USB hosts 10A and 10B operate according to identical or similar algorithms, the unique addresses that the USB hosts 10A and 10B re-assign at Steps S636 and S638 in FIG. 7 may also be the same, so that the re-assignment of the unique addresses will be repeated. Furthermore, in the Wireless USB system 2, there is a strong possibility that the first to the third address conflicts will occur.

Accordingly, this embodiment of the present invention addresses the above-identified problems and provides a USB device that can perform beacon transmission appropriately and avoid address conflicts. The configuration and operation of the USB device according to this embodiment will be explained below with reference to FIGS. 9 to 12.

Figure 9:
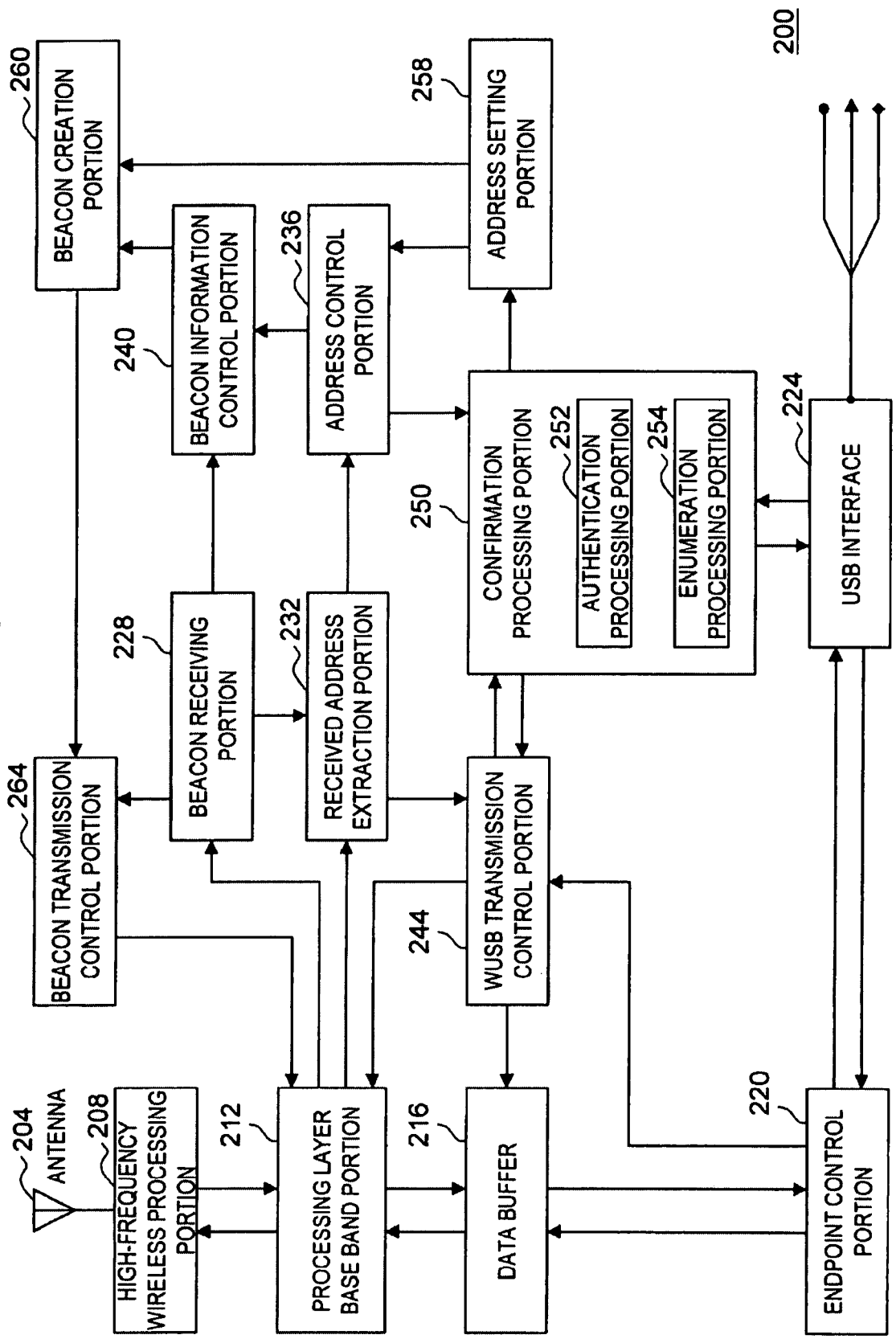
FIG. 9 is a block diagram that shows the structure of a USB device according to the embodiment of the present invention.

FIG. 9 is a block diagram that shows the configuration of the USB device 200 according to the present embodiment as a wireless communications unit. The USB device 200 is provided with an antenna 204, a processing layer base band portion 212, a data buffer 216, an endpoint control portion 220, a USB interface 224, a beacon receiving portion 228, a received address extraction portion 232, an address control portion 236, a beacon information control portion 240, a WUSB transmission control portion 244, a confirmation processing portion 250, an address setting portion 258, a beacon creation portion 260, and a beacon transmission control portion 264.

The antenna 204 functions as a transmission portion and a receiving portion that can use high-frequency wireless signals to transmit and receive specified information to and from the USB host 100 and external units. The expression "specified information" denotes data and the like that are transmitted and received by way of the beacons and in the DRP MAS slots.

A high-frequency wireless processing portion 208 amplifies the high-frequency wireless signals received by the antenna 204 and converts them into received signals. The high-frequency wireless processing portion 208 also has a function that converts the specified information transmitted by the antenna 204 into high-frequency wireless signals that serve as transmission signals.

The processing layer base band portion 212 demodulates the received signals and converts them into received data. The processing layer base band portion 212 also modulates transmission data and converts it into the transmission signals. The modulation and demodulation methods may be a direct diffusion method, a frequency hopping method, or the like. The data buffer 216 stores the received data and the transmission data.

The endpoint control portion 220, along with the device(s) with which the USB device 200 is communicating, controls the data buffer 216 as an endpoint for data transmission. The USB interface 224 may be a connection portion that connects to other devices through a USB cable, for example.

The beacon receiving portion 228 receives the beacons that are transmitted during the beacon period by nearby wireless communications units (USB hosts or USB devices). The received address extraction portion 232 extracts the addresses of the nearby wireless communications units from the beacons and other frames (for example, MMC frames) that the beacon receiving portion 228 receives.

The address control portion 236 controls the addresses that the received address extraction portion 232 extracts. That is, the address control portion 236 may be configured such that it includes a storage portion and a control portion, which stores in the storage portion the addresses that the received address extraction portion 232 extracts, and also reads out the addresses from the storage portion. The storage portion may be a storage medium such as, for example, a non-volatile memory such as an electrically erasable programmable read-only memory (EEPROM), an erasable programmable read-only memory (EPROM), or the like, a magnetic disk such as a hard disk, a floppy® disk, or the like, an optical disk such as a compact disc recordable (CD-R), a compact disc rewritable (CD-RW), a digital versatile disc recordable (DVD–R), a digital versatile disc rewritable (DVD–RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE), or the like, or a magneto-optical (MO) disk or the like.

The beacon information control portion 240 controls the various types of parameters that are carried by the beacons that are received by the beacon receiving portion 228. In the same manner as the address control portion 236, the beacon information control portion 240 may be configured such that it includes a storage portion and a control portion, which stores the various types of parameters in the storage portion, and also reads out the various types of parameters from the storage portion. The beacon information control portion 240 may also be configured as a single unit with the address control portion 236.

The WUSB transmission control portion 244 controls the exchange of frames in the Wireless USB system, based on the MMC frame received from the USB host 100. For example, the WUSB transmission control portion 244 may be used to handle unique address re-assignment requests to the USB host 100. The confirmation processing portion 250 performs at least one of the authentication processing and the enumeration processing as confirmation processing with the USB host 100. The confirmation processing portion 250 can also perform the confirmation processing in a time interval determined by the USB host 100.

If the confirmation processing portion 250 is configured in this manner, interference in wireless communications with nearby USB devices can be avoided. That is, in a case where none of the USB devices 200 in the vicinity, including the own device, has transmitted a beacon, it is difficult for each USB device 200 to determine what time slot it can use. Therefore, it is effective for the USB host 100 to actively set the times for the confirmation processing with the USB devices 200 such that interference does not occur. The confirmation processing portion 250 configured in this manner may be provided with an authentication processing portion 252 that performs the authentication processing and an enumeration processing portion 254 that performs the enumeration processing.

The address setting portion 258 sequentially sets the assigned addresses assigned by the USB host 100 as the device addresses. The assigned addresses may be, for example, the unauthenticated address, the default address, and the unique address (the Wireless USB device address).

The beacon creation portion 260 starts to create the beacon after an address is assigned by the USB host 100. The beacon transmission control portion 264 performs control such that periods are set for transmitting beacons and the beacons are transmitted during the set periods. In the related known technology, before requesting connection to the USB host 100, the device creates its own address and transmits a beacon using that address before communication is established. Therefore, in the related known technology, beacons are transmitted many times with different addresses until the unique address is assigned, which risks confusion among other devices in the vicinity. There is also a strong possibility that address conflicts will occur.

In contrast, the beacon creation portion 260 according to the present embodiment starts to create the beacon after the unique address is assigned and the unique address is set as the device address, for example. This alleviates the problems caused by changing the addresses many times in the beacons that the USB device 200 transmits. Moreover, it is possible to configure the beacon creation portion 260 according to the present embodiment such that the first to fourth address conflicts that were explained with reference to FIG. 7 are avoided. This is explained in detail below with reference to FIGS. 10 to 12.

Figure 10:
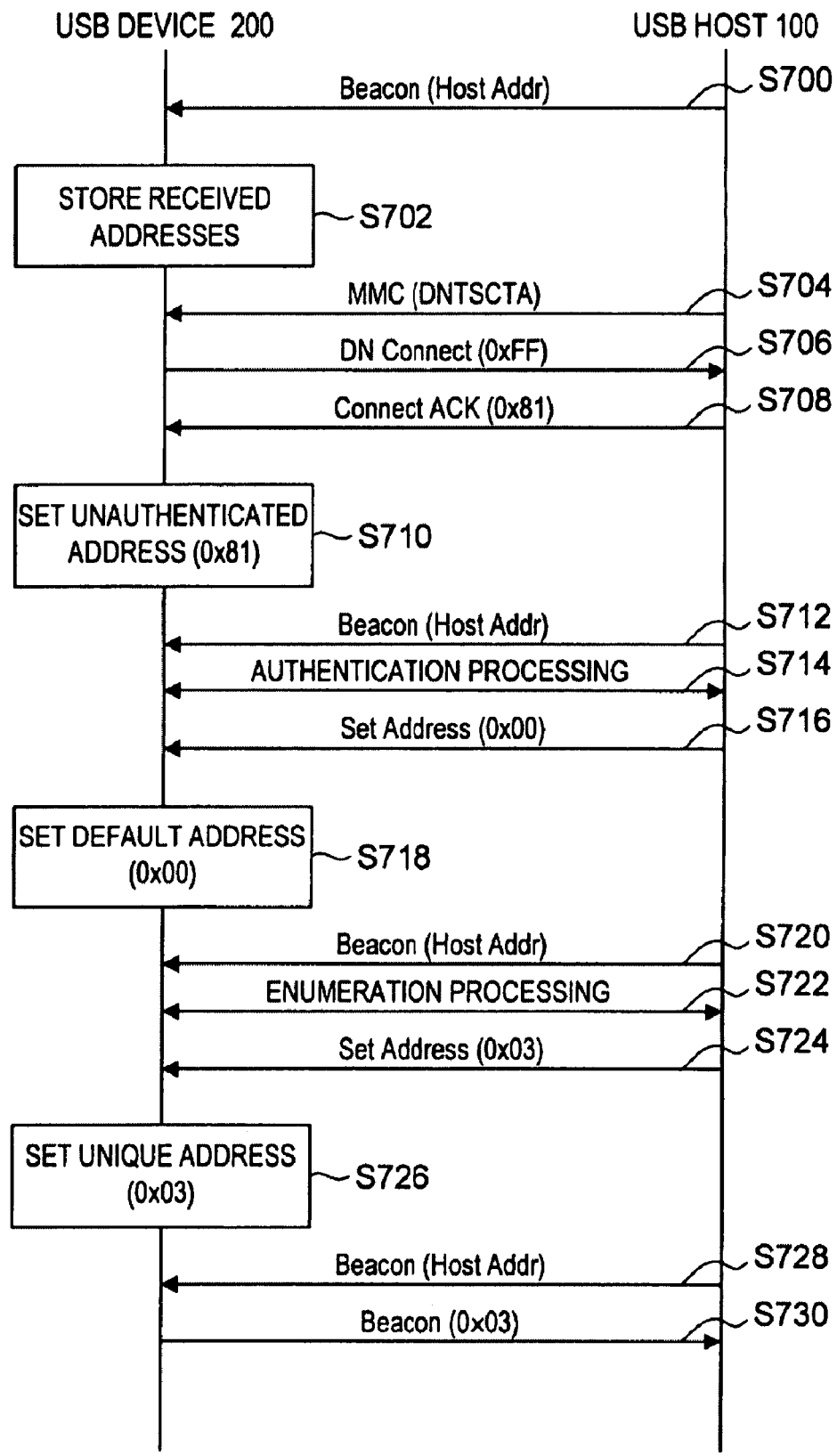
FIG. 10 is a timing chart that shows the flow of operation of the Wireless USB system according to the embodiment.

FIG. 10 is a timing chart that shows a flow of operation of the Wireless USB system 1. The Wireless USB system 1 includes the USB host 100 and the USB device 200 that perform wireless communications with one another.

First, the USB host 100 transmits to its surroundings a beacon containing the address (Host Addr) of the USB host 100, and the USB device 200 receives the beacon (Step S700). Next, the USB device 200 stores the addresses used in the beacons and MMC frames transmitted by the wireless communications units in the vicinity (Step S702).

Next, the USB host 100 transmits an MMC frame that contains a DNTSCTA (Step S704). The DNTSCTA, as explained above, is information that indicates a time slot that is provided for the USB device 200 to transmit a DN_Connect requesting a connection to the USB host 100. When the USB device 200 receives the MMC frame, the USB device 200 transmits the DN_Connect to the USB host 100 based on the DNTSCTA (Step S706). Note that in the MAC header of the DN_Connect, 0xFF is entered as the device address.

Next, the USB host 100 transmits a Connect Acknowledge in response to the DN_Connect from the USB device 200 (Step S708). The Connect Acknowledge carries a value of 0x81, for example, as the unauthenticated address, but any value in the range of 0x80 to 0xFE may be used. The transmission of the Connect Acknowledge by the USB host 100 assigns the unauthenticated address 0x81 to the USB device 200 as the assigned address, and the USB device 200 sets the unauthenticated address 0x81 as its address (Step S710).

Thereafter, when the beacon period comes, the USB host 100 transmits a beacon that contains the host address (Step S712). A characteristic of the USB device 200 according to the present embodiment is that the USB device 200 does not transmit a beacon at this point, even though the beacon period has come.

Next, the USB host 100 and the USB device 200 perform authentication processing to authenticate one another (Step S714). The authentication processing may be a 4-way handshake, for example. When the authentication processing is completed, the USB host 100 transmits a Set Address (0x00) that instructs the USB device 200 to set its address to 0x00 as the default address (Step S716).

When the USB device 200 receives the Set Address (0x00), it sets its own address to the default address 0x00 (Step S718). Thereafter, when the beacon period comes, the USB host 100 transmits a beacon that contains the host address (Step S720). In contrast, the USB device 200 does not start beacon transmission and does not transmit a beacon.

Next, the USB host 100 and the USB device 200 perform enumeration processing (Step S722). The enumeration processing includes processing that exchanges information that indicates various types of parameters of the USB host 100 and the USB device 200 that are called descriptors. When the enumeration processing is completed, the USB host 100 transmits a Set Address (0x03) that instructs the USB device 200 to set its address to 0x03 as the unique address (Step S724). Note that the unique address may be any value in the range of 0x00 to 0x7F.

When the USB device 200 receives the Set Address (0x03), it sets its own address to the unique address 0x03 (Step 726). Thereafter, when the beacon period comes, the USB host 100 transmits a beacon that contains the host address (Step S728). Because the USB device 200 has set the unique address as its own address, the USB device 200 also transmits a beacon that contains the unique address 0x03 as the device address (Step S730).

Because the USB device 200 according to the present embodiment thus starts transmitting the beacon after it sets the unique address as its own address, confusion among wireless communications units in the vicinity due to multiple address changes can be prevented. Moreover, as will be explained below with reference to FIG. 11, addresses conflicts can be prevented in cases where a plurality of USB hosts 100 and USB devices 200 are present in the vicinity.

Figure 11:
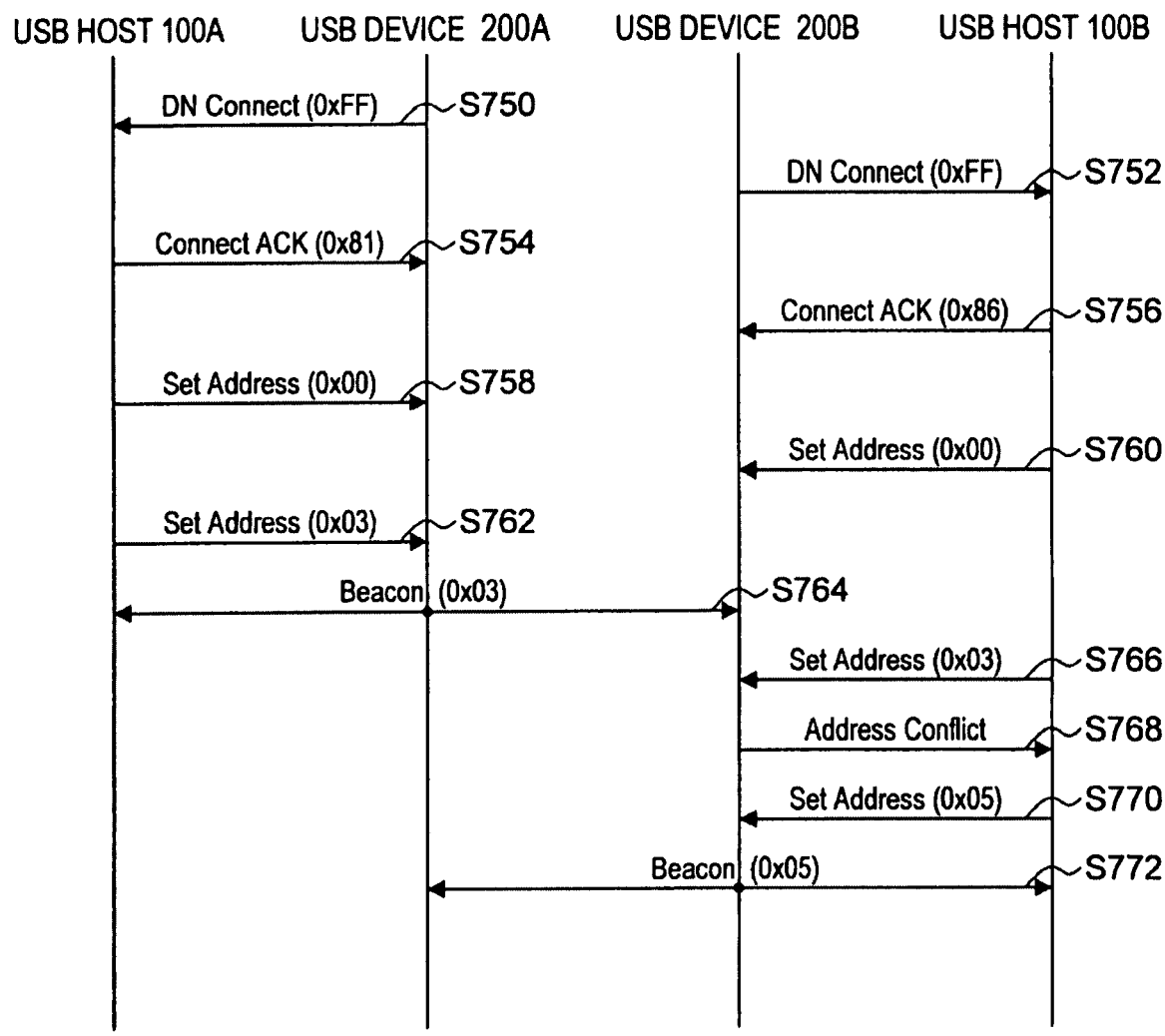
FIG. 11 is a timing chart that shows operations of the Wireless USB system that is in close proximity to a plurality of USB hosts and USB devices according to the embodiment.

FIG. 11 is a timing chart that shows operations of the Wireless USB system 1 that is in close proximity to a plurality of USB hosts 100 and USB devices 200. The Wireless USB system 1 includes a USB host 100A, a USB device 200A that performs wireless communications under the control of the USB host 100A, a USB host 100B, and a USB device 200B that performs wireless communications under the control of the USB host 10B.

First, the USB device 200A transmits the DN_Connect (0xFF) to the USB host 100A (Step S750). In the same manner, the USB device 200B transmits the DN_Connect (0xFF) to the USB host 100B (Step S752).

Here, the USB devices 200A and 200B according to the present embodiment do not transmit to their surroundings beacons that contain 0xFF as their own addresses, even when their respective beacon slots come. Therefore, the first address conflict, which occurs when the USB devices 200A and 200B transmit beacons that contain the same address 0xFF, can be avoided.

Next, the USB host 100A transmits a Connect Acknowledge (0x81) to the USB device 200A (Step S754). In the same manner, the USB host 100B transmits a Connect Acknowledge (0x86) to the USB device 200B (Step S756).

Here, the USB devices 200A and 200B according to the present embodiment do not transmit to their surroundings beacons that contain the unauthenticated addresses 0x81 and 0x86 as their own respective addresses, even when their respective beacon slots come. Therefore, the second address conflict, which occurs when beacons are transmitted that contain the same unauthenticated address, can be avoided, even in a case where the USB devices 200A and 200B are assigned the same unauthenticated address.

Next, the USB host 100A transmits a Set Address (0x00) to the USB device 200A (Step S758). In the same manner, the USB host 100B transmits a Set Address (0x00) to the USB device 200B (Step S760).

Here, the USB devices 200A and 200B according to the present embodiment do not transmit to their surroundings beacons that contain the default address 0x00 as their own addresses, even when their respective beacon slots come. Therefore, the third address conflict, which occurs when the USB devices 200A and 200B transmit beacons that contain the same default address 0x00, can be avoided.

Next, the USB host 100A transmits a Set Address (0x03) to the USB device 200A (Step S762). When the USB device 200A receives the Set Address (0x03), the USB device 200A sets its own address to the unique address 0x03, then creates and starts to transmit a beacon that contains the unique address 0x03 (Step S764).

Next, the USB host 100B transmits a Set Address (0x03) to the USB device 200B (Step S766). At this time, because the USB device 200B has received the beacon transmitted by the USB device 200A, the USB device 200B can determine that if it also transmits a beacon that contains the unique address 0x03, it will conflict with the unique address of the USB device 200A. Therefore, the USB device 200B transmits an Address Conflict Notification to the USB host 100B to request re-assignment of the unique address (Step S768).

Next, the USB device 200B receives a Set Address (0x05) from the USB host 100B (Step S770). Then the USB device 200B sets the re-assigned unique address 0x05 as its own address and creates and starts to transmit a beacon that contains the unique address 0x05. Thus, in a case where the USB devices 200A and 200B according to the present embodiment are assigned the same unique address, only one of the USB devices 200A and 200B requests the re-assignment of the unique address, so the unique address conflict can be avoided.

Figure 12:
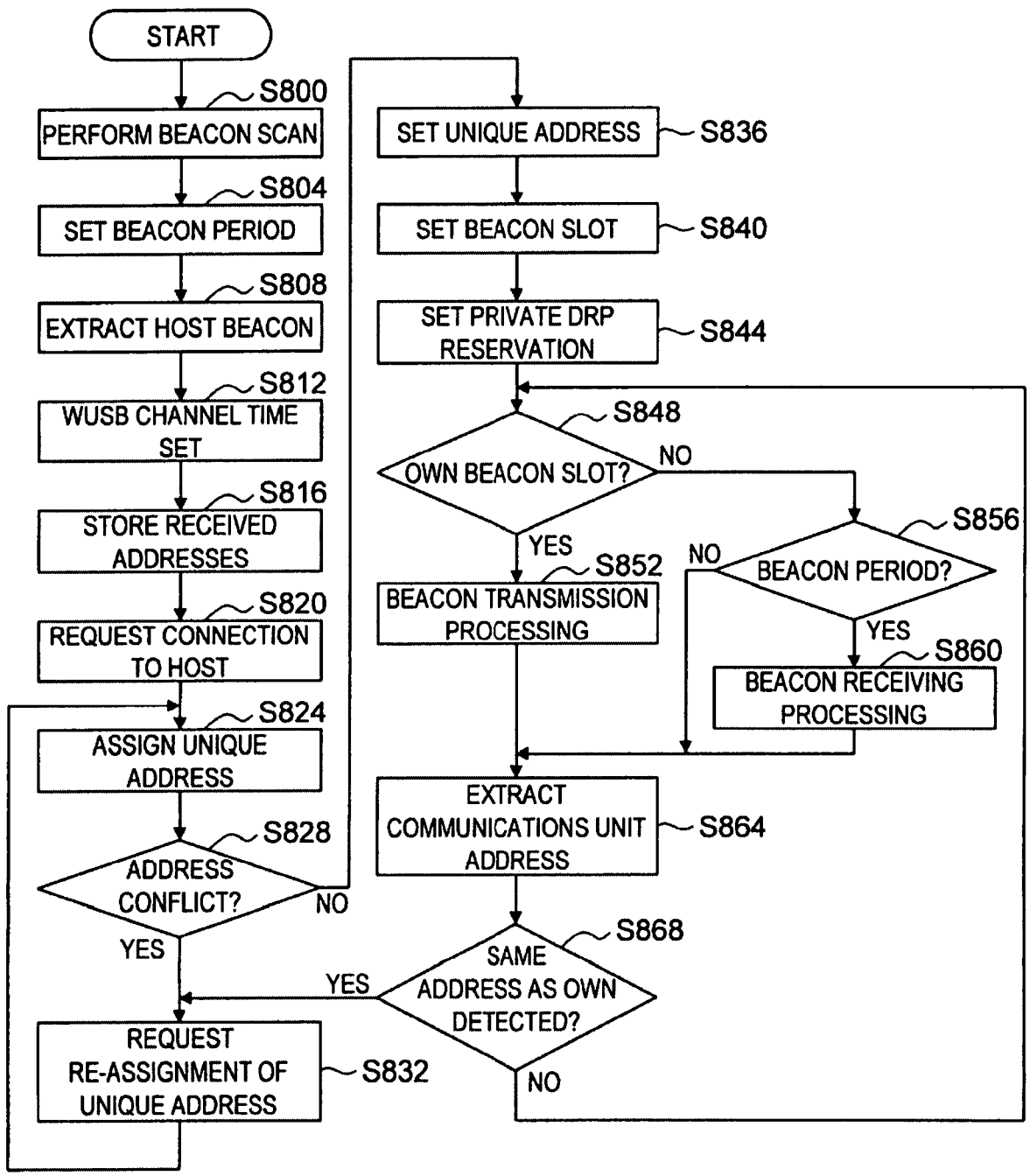
FIG. 12 is a flowchart that shows the flow of operations of a USB device according to the embodiment.

FIG. 12 is a flowchart that shows a flow of operations of the USB device 200 according to the present embodiment. First, the USB device 200 scans to receive beacons that are transmitted by nearby USB hosts or devices (Step S800). Then the USB device 200 sets the beacon period based on the beacons it receives (Step S804).

Next, the USB device 200 extracts the beacon that was transmitted by the USB host 100 (Step S808). Then the USB device 200 sets the WUSB channel time based on the DRP reservation status that is contained in the extracted beacon (Step S812). Finally, the USB device 200 stores in the built-in storage portion the addresses that are contained in the MAC headers of the beacons and MMC frames it receives (Step S816).

Next, the USB device 200 requests a connection to the USB host 100 in the WUSB channel time that it set (Step S820). Then, after the confirmation processing is completed, the USB host 100 assigns the unique address to the USB device 200 (Step S824). Next, the USB device 200 determines whether or not there is a conflict between the unique address assigned by the USB host 100 and any of the addresses used by the wireless communications units in the vicinity, which addresses the USB device 200 has stored in its own storage portion (Step S828). If the USB device 200 determines that an address conflict has occurred, it requests the USB host 100 to re-assign the unique address (Step S832).

If the USB device 200 determines at Step S828 that an address conflict will not occur, the USB device 200 sets as its own address the unique address that assigned by the USB host 100 (Step S836). Next, the USB device 200 sets an unused beacon slot and makes a private DRP reservation that will be used in the Wireless USB system (Steps S840, S844).

Next, the USB device 200 determines whether or not it own beacon slot has come (Step S848). If its own beacon slot has come, the USB device 200 transmits its beacon (Step S852). Even if its own beacon slot has not come, if the USB device 200 determines that it is in the beacon period (Step S856), the USB device 200 receives the beacons, updates its parameters, and the like (Step S860).

Next, the USB device 200 extracts the addresses of the wireless communications units in the vicinity (Step S864)

and determines whether or not there is a conflict with its own address (Step S868). If the USB device 200 detects an address conflict, it returns to Step S832 and requests the USB host 100 to re-assign the unique address. If the USB device 200 does not detect an address conflict, it returns to Step S848 and repeats its routine operation.

As explained above, the USB device 200 according to the embodiment of the present invention does not transmit a beacon when it has not been assigned an address by the USB host 100, so the need for the USB device 200 to create a temporary address on its own is alleviated. The process by which the USB device 200 changes its own address and transmits a beacon every time an address change instruction comes from the USB host 100 can also be alleviated. Moreover, it is acceptable for the USB device 200 to determine whether or not an address conflict exists only for the unique address that is finally assigned by the USB host 100. Therefore, the configuration and operation of the USB device 200 can be simplified.

Further, the USB device 200 can be made not to transmit the unique address that is assigned by the USB host 100 if the unique address conflicts with an address that is used by a wireless communications unit in the vicinity. That is, even if a plurality of USB hosts are present in the vicinity, it is possible to perform wireless communications without conflicts.

Furthermore, because it is acceptable for the USB device 200 to notify the USB host 100 only when an address conflict exists for the unique address that is finally assigned by the USB host 100, the bandwidth used by the USB device 200 can be controlled. Moreover, because the USB device 200 does not transmit a beacon until it sets the unique address as its own address, confusion among wireless communications units in the vicinity can be prevented.

It should be understood by those skilled in the art that various modifications, combinations, sub-combinations and alterations may occur depending on design requirements and other factors insofar as they are within the scope of the appended claims or the equivalents thereof.

For example, in the embodiment described above, the case where the USB device 200 creates and starts to transmit the beacon after the unique address is assigned was explained as an example, but the present invention is not limited by this example. For example, the USB device 200 may be made to transmit the beacon after the unauthenticated address or the default address is assigned. If such a configuration is used, at least the process by which the USB device 200 creates its own temporary address can be alleviated.

Furthermore, it is not necessary for every step in the processing shown in the flowcharts and timing charts in this specification to be performed in a temporal sequence according to the order shown in the flowcharts and timing charts. The present invention may be deemed to include processing that is performed in parallel and individually (for example, parallel processing or object-oriented processing).

In addition, there is provided a computer program that causes an information processing unit to perform the wireless communications method described above and a storage medium that stores the program.

What is claimed is:

1. A wireless communications unit that, as a USB device, performs wireless communications with a USB host in a Wireless USB system, the wireless communications unit comprising:

an address setting portion that sets an assigned address assigned by the USB host as the wireless communications unit's own address; and
a beacon creation portion that starts to create a beacon after the assigned address is set as the wireless communications unit's own address.

2. The wireless communications unit according to claim 1, wherein the assigned address is a wireless USB device address.

3. The wireless communications unit according to claim 1, further comprising:

a confirmation processing portion that performs a specified confirmation processing;
wherein the confirmation processing portion performs the confirmation processing with the USB host using a time interval that the USB host sets when assigning the assigned address.

4. The wireless communications unit according to claim 3, wherein the confirmation processing is an authentication processing that is performed with the USB host using the time interval that the USB host sets.

5. The wireless communications unit according to claim 3, wherein the confirmation processing is an enumeration processing that is performed with the USB host using the time interval that the USB host sets.

6. The wireless communications unit according to claim 1, wherein the USB host is requested to re-assign the assigned address when the assigned address conflicts with an address that a USB host or USB device in the vicinity is using.

7. A wireless communications method for performing wireless communications between a wireless communications unit, as a USB device, and a USB host in a wireless USB system, comprising the steps of:

assigning an address to the wireless communications unit, the address being assigned by the USB host;
setting the address assigned by the USB host as the wireless communications unit's own address;
creating a beacon that contains the set address as the wireless communications unit's own address; and
transmitting the created beacon.

8. A wireless communications system that comprises a USB host and a wireless communications unit as a USB device, wherein the USB host assigns an address to the wireless communications unit, and
the wireless communications unit includes
an address setting portion that sets the address assigned by the USB host as the wireless communications unit's own address, and
a beacon creation portion that starts to create a beacon after the assigned address is set as the wireless communications unit's own address.

9. A computer-readable medium comprising program instructions, which, when executed by a computer, cause the computer to function as a wireless communications unit that includes:

an address setting portion that sets an address assigned by a USB host in a Wireless USB system as the wireless communications unit's own address; and
a beacon creation portion that starts to create a beacon after the assigned address is set as the wireless communications unit's own address.

10. The wireless communications method according to claim 7, wherein the assigned address is a wireless USB device address.

11. The wireless communications method according to claim 7, further comprising: performing a specified confirmation processing with the USB host using a time interval that the USB host sets when assigning the assigned address.

12. The wireless communications method according to claim 11, wherein the confirmation processing is an authentication processing that is performed with the USB host using the time interval that the USB host sets.

13. The wireless communications method according to claim 11, wherein the confirmation processing is an enumeration processing that is performed with the USB host using the time interval that the USB host sets.

14. The wireless communications method according to claim 7, wherein the USB host is requested to re-assign the assigned address when the assigned address conflicts with an address that a USB host or USB device in the vicinity is using.

* * * * *